(12) United States Patent
Mohler et al.

(10) Patent No.: US 11,740,382 B2
(45) Date of Patent: Aug. 29, 2023

(54) SYSTEM AND METHOD FOR IDENTIFYING AN INDETERMINATE OBJECT IN AN ENCOMPASSING MEDIUM

(71) Applicants: Sherman Quackenbush Mohler, Gilbert, AZ (US); Craig H Sickles, Gilbert, AZ (US); Jessica L. Noviello, Hyattsville, MD (US); Jennifer Leigh Borst, Prescott, AZ (US); Derek R. Hoffman, Tucson, AZ (US); Mariah D. Heck, Tempe, AZ (US)

(72) Inventors: Sherman Quackenbush Mohler, Gilbert, AZ (US); Craig H Sickles, Gilbert, AZ (US); Jessica L. Noviello, Hyattsville, MD (US); Jennifer Leigh Borst, Prescott, AZ (US); Derek R. Hoffman, Tucson, AZ (US); Mariah D. Heck, Tempe, AZ (US)

( * ) Notice: Subject to any disclaimer, the term of this patent is extended or adjusted under 35 U.S.C. 154(b) by 207 days.

(21) Appl. No.: 17/248,796

(22) Filed: Feb. 8, 2021

(65) Prior Publication Data
US 2022/0252527 A1 Aug. 11, 2022

(51) Int. Cl.
*G01V 5/02* (2006.01)
*G06N 20/00* (2019.01)
*G01V 5/00* (2006.01)

(52) U.S. Cl.
CPC ............. *G01V 5/02* (2013.01); *G01V 5/0075* (2013.01); *G01V 5/0083* (2013.01); *G06N 20/00* (2019.01)

(58) Field of Classification Search
CPC ...... G01V 5/02; G01V 5/0075; G01V 5/0083; G06N 20/00
See application file for complete search history.

(56) References Cited

U.S. PATENT DOCUMENTS

| | | | | |
|---|---|---|---|---|
| 5,773,821 A | * | 6/1998 | Jones ....................... | G01V 5/02 |
| | | | | 250/395 |
| 6,989,527 B2 | * | 1/2006 | Bosco .................... | G01T 1/169 |
| | | | | 250/253 |

FOREIGN PATENT DOCUMENTS

KR 20130128696 A * 11/2013 ............. G08B 25/08

OTHER PUBLICATIONS

Park et al.—KR 2013-0128696 A—PE2E Search English Abstract obtained Dec. 1, 2022 (Year: 2022).*

* cited by examiner

*Primary Examiner* — David P Porta
*Assistant Examiner* — Jeremy S Valentiner (57) ABSTRACT

An apparatus and method are provided for detecting indeterminate objects of interest contained within an encompassing medium using radiation event counts.
Statistical analysis of measured events, such as local gamma radiation counts, is used to determine the probability of an object's presence in a field area. Event-detecting nodes are used to establish the baseline event activity such as background radiation (including environmental factors) in the field area, at a location determined unlikely to contain objects of interest due to geologic context or previous digging. Each node then independently detects and quantifies event activity, in an area to be evaluated, to derive evidence of the probability that an object of interest is within the medium. The calculated probabilities are then used to guide exploratory digging by indicating the likely direction and depth of an object of interest relative to the apparatus.

16 Claims, 7 Drawing Sheets

SYSTEM AND METHOD FOR IDENTIFYING AN INDETERMINATE OBJECT IN AN ENCOMPASSING MEDIUM

RELATED U.S. PATENT DOCUMENTS

This application claims the benefit of provisional patent application No. 62/995,771 filed on Feb. 13, 2020.

BACKGROUND

Technical Field

The present invention relates to object detection where the actual object and its characteristics may not be completely known or understood due to the nature of the encompassing medium and the condition of the object.

Prior Art

There are many technical fields that are challenged with the need to detect when an artifact or natural object of interest may exist within a specific area, which may not be easily detectible due to an encompassing medium that can block or attenuate detectible signals or events being emitted by the object. In addition, such detectible events may not only be coming from the object but from the medium itself and from other locations outside the medium where an apparatus is located to search for signals e.g. quantifiable events being emitted from the medium. To further complicate matters, quite often the characteristics of said object of interest such as size, shape, age, orientation, and even the depth of the object within the encompassing medium are often unknown, any and all of which could complicate any clear quantification of the events which can lead to detection and identification.

As an example, because of the aforementioned complications, archeologists and paleontologists often can only rely on mere visual observation of the area to identify objects eroding out of the earth, or, more generally, the "matrix". They then start time consuming digging into said matrix in the vicinity, hoping there may be other objects of interest retained in a more pristine state within the encompassing matrix. Attempts have been made to use event detection, largely the events of gamma radiation, to determine if an object of interest such as a fossilized bone is within range of a gamma detector hauled out into the field with the scientist. Unfortunately the radiation given off by objects like fossil bones are sometimes only subtly higher in gamma radiation than the typical background radiation in the area, thus thwarting detection. The typical approach then, which has had some limited success, is to surround the detector with large amounts of lead shielding with only a small opening pointing to a very small area of the matrix. The detector is then allowed to run, but it needs to be run for a significantly longer amount of time. This is because this approach is further complicated by the fact that gamma events occurring in a specific location are not consistent but rather have their own spectrum of probabilities of occurring at any given instant in time. Another unfortunate downside of the lead shielding is the tremendous additional weight of the lead shielding; often the shielded detectors weigh hundreds of pounds. They are only viable on reasonably flat surfaces, which are quite unlikely especially in the field of paleontology where the study area is often an eroded and rough formation left millions of years ago from an ancient sea or shoreline. Unlike other gamma radiation and x-ray techniques, the apparatus and method described herein is less intrusive and damaging to the environment. Instead of using heavy lead shielding that could possibly crush fragile fossils underneath, or taking core samples that could harm the physical appearance of a historical landmark, an apparatus based upon this invention presented here can weigh less than a few pounds and has no need to disturb the earth beneath it.

Other fields of industry that need to detect artifact or natural objects obscured by encompassing medium also often take advantage of shielding to eliminate events emanating from outside the area of interest. This is a more appropriate approach in a controlled environment, when the area of interest might be a vehicle stop on a freeway, and the object of interest might be a nuclear device and the encompassing medium is a vehicle. However, the use of heavy shielding hampers the ability to produce an apparatus that can be moved into additional locations quickly and efficiently if indeed gamma radiation is the event being gauged. Often these fields of industry, including national defense, create and use apparatuses which assume a great deal is known about the target object of interest, such as the amount of radiation that could be expected off a viable nuclear device, or the size and weight or color of a vehicle that can carry such a weapon. Because this approach relies on such assumptions, it can result in false negative readings should an object of interest vary to far from the characteristics expected. Many other apparatuses used in these fields also do not have a pure passive capacity for event detection, and assume the need for injecting additional stimuli into the area, such as x-rays, in order stimulate events from an object of interest.

In all, these aforementioned techniques can work in certain controlled environments, but they are also somewhat inflexible and prone to missing potential objects of interest having characteristics not within certain parameters.

SUMMARY

The apparatus and method herein disclosed and described provides a solution to the shortcomings in prior art through the provision of creating a scalable, adaptable, and portable invention for detecting and quantifying the probability that a potential artifact or natural object of interest is within a specific area, regardless of whether the object's characteristics are fully known or understood. Such an approach provides a minimal risk of false negatives and provides the ability for adaptation over time for identifying specific target objects found during work in the target area while continuing to provide the flexibility to identify the probabilities of additional objects of interest with initially indeterminate characteristics.

The apparatus to identify the probabilities of an artifact or natural object of interest in an encompassing medium is equipped with a plurality of event detecting nodes, each of which is capable of performing independent quantifiable probabilistic analysis. The apparatus first establishes the range of baseline event collections in an area of the medium unlikely to have any encompassed objects of interest. When the apparatus is then moved to a specific area where an object of interest may be embedded in the encompassing medium, said nodes can then take object detection collections to independently detect and quantify the profile of event activity to derive evidence, when compared to the baseline, of the probabilities that an object of interest is within the medium.

In one embodiment, a specific example of the invention would be an apparatus for detecting the possible presence of fossilized bones in a target area based upon a subtle increase of radiation given off by the fossilized bones within the encompassing soil, or matrix as it is referred to in the field of paleontology, archaeology, and other investigative and scientific disciplines that involve fieldwork. The researcher would first select specific spots in a formation where a target object, such as a fossilized bone fragment, is highly unlikely, such as a tailings area from previous digging. There, each node would be given instruction by the apparatus to gather readings of background gamma radiation events it experiences every second, and to do so for a set period of time (e.g. 60 samples where each sample detects the number of events occurring per second). This allows the nodes to gather datasets of gamma events from both the mineral composition of the soil of the geological formation, and the broader atmospheric gamma radiation. Each node can take multiple dataset collections regarding detected gamma events and use them to conduct analysis on the quality and consistency of the data, thus allowing it to model outlier behaviors for gamma radiation for both the soil as an encompassing medium and the confounding atmospheric radiation. It also allows for modeling and retention of gamma event radiation behavioral changes based upon other conditions such as time of day and elevation. In this manner, by allowing each node to capture and retain its own fully robust set of baseline datasets regarding gamma radiation to be detected in the general area, the nodes are able to identify, or at least constrain, the probabilities of a potential artifact or natural object contributing additional gamma radiation in the area when placed in a location more likely to contain an object of interest. Due to the computing and storage capabilities of modern electronics, each of these nodes can be made weighing as little as a few grams or just slightly heavier when gaseous tubes are used as part of the gamma sensors within a node. Since lead shielding is not necessary, an apparatus with dozens, hundreds, or even thousands of such nodes is possible. The resulting apparatus is both light enough for field work, and capable of analyzing an area of several square meters for the probability of a fossil within the matrix in just a few minutes. Such an apparatus can be used in very rugged terrain, placed and moved by robots, or landed by drones (especially in harsh or dangerous environments) and then programmed to wirelessly transmit the raw datasets from the nodes along with the node's probabilistic analysis back to a reporting station or to a machine learning environment hosted in a public compute cloud such as but not limited to Amazon AWS. Each node is capable of its own sophisticated analysis of whether anything other than an expected level of background events has occurred, and the overall apparatus is also capable of gathering all data reported to it from the nodes and doing a more comprehensive analysis with the broader dataset. In this manner even subtle differences between background events can be detected as evidence of an encompassed object, thus eliminating the need for costly and heavy shielding or external stimuli such as x-ray injection into the area of interest. This fundamental paradigm shift allows for the detection of objects of interest that are not well understood and discretely describable when initially searched for. In effect, the apparatus models the paradigm of approaching each target area of interest with a general but robust "null hypothesis" for the likelihood nothing of interest will be found, but with strong evidential guardrails around when it is acceptable to reject this null hypothesis. If while in a specific area of interest any of the nodes in the overall apparatus generates a probability that allows the researcher to reject the null hypothesis with, say, a 95 percent confidence level, that then can justify starting to dig in that specific location even if the object of interest isn't understood to be a specific type of object with clearly determined event behaviors. This is an important preferred approach which recognizes that a desirable artifact or natural object such as a multi-million year old fossilized bone or skull could be in an innumerable number of stages of decomposition within the medium, or it could be of an unknown age which might then mean the initial decomposition of Uranium accrued in the bones might be coming from other radioactive elements that are part of the Uranium decay chain. This not only allows the scientist in the field to be as efficient as possible finding natural object like fossils and artifacts in as pristine a state as possible without additional harm from being exposed to the environmental elements, it also allows the scientist to be a gentle as possible on the lands and earth formation he or she truly cared about, minimizing unnecessary digging.

In one embodiment, the apparatus can be configured to select various techniques for ensuring the nodes have robust baseline event datasets for analysis and comparison to event datasets gathered in specific locations of interest. One such technique is to have the apparatus trigger physical movement to multiple locations where it is considered an extremely rare likelihood an object of interest is within detection distance of the apparatus but still reflecting the expected baseline event profile for the general area of interest like a geological formation. Other techniques can include but are not limited to the apparatus giving the nodes specific algorithms for outlier normalizations, or instructions on how to groom outlier data gathered during baseline datasets based upon data sharing amongst the nodes within the apparatus to compare baseline results and look for common outliers representing atypical events.

In one embodiment, all nodes within the apparatus retain its object detection collections at each specific location the apparatus is moved to. As a method and strategy, the apparatus is moved in small discrete steps and then each node not only compares results regarding its baseline collection to the most recent object detection collection, but they can also look for quantifiable and relevant changes in events it has detected between locations. In this manner, all nodes can help gather broader evidence of an object of interest becoming closer or moving farther away from any given node, or the entire apparatus.

In one embodiment, each node can manage and maintain a series of baseline collections including but not limited to a "sliding temporal" window of baseline events, to compensate for environmental factors during testing such as temperature and atmospheric conditions affecting the electronic components across time during the workday.

In one embodiment, while working in the broader area of interest, after discovering and removing a specific artifact or natural object from the encompassing medium the object detection collections gathered by the apparatus that led to the discovery of said object can allow for additional evidential tracking of objects with quite similar characteristics such as but not limited to size, position, orientation, and depth of similar objects that might still be encompassed in the medium. Those specific object detection collections can help provide a more concrete event behavioral analysis including but not limited to event frequency profiling, specific event energy spectrums, event statistical outlier profiles, and so on. This could be accomplished by, but not limited to, the apparatus sending instructions to all nodes to set this previous event collection as an additional new baseline collection, but with its algorithm matching similarities to that profile rather than using it for differential analysis regarding the null hypothesis. In these analyses, the null hypothesis is that there is no additional, detectible source of gamma radiation encompassed within the matrix beneath the apparatus. Alternatively, the apparatus may tell all nodes to retrieve and set as a baseline a specific node's baseline collection gathered at the exact certain time the specific artifact was found by the apparatus that best reflects the object's newly discovered profile. The apparatus may then instruct the user to move the apparatus to the specific location the initial target object eroded out of the medium, and then have the apparatus physically move or be moved in such a way along different directions to allow for a "hot versus cold" mapping of object detection collections, thus giving guidance regarding the physical direction the user leveraging the apparatus should follow to continue extracting objects of interest out of the medium. In this manner the apparatus is operating in a manner to seek a specific type of object, rather than its more generic behavior of identifying when to reject the null hypothesis of no object of interest being within the targeted area.

In one embodiment the nodes in the apparatus can be programmed to leverage not only the general baselines allowing it to model the null hypothesis for no objects of interest within the targeted area of the medium, but they can simultaneously include object detection collections representing specific objects that have previously been found. Thus, during each ongoing collection, the apparatus can be used both for detecting general indeterminate objects of interest where specific characteristics of the object are not clearly known, and for positive pattern matching for specific objects of interest that have previously been found in the medium.

In one embodiment, nodes can independently declare an event collection it just took may be invalid and request the apparatus not be moved during a "retake" collection session. Each node may also instead suggest to the apparatus not to use its data as part of a broader analysis for a specific time period due to node collection quality issues. A node may instead declare a request for the apparatus to modify parameters for all such event detecting nodes such as the samples per collection, or the unit of time per sample, in order to improve the quality of the data being collected. The apparatus then decides what parameters for these measurements best balance the ability to cover as much as possible of the general area of interest during operation, versus the quality needed to ensure a minimum of false negative collections e.g. potentially missed objects of interest. This embodiment may instead manage such decisions as to node event collection quality and parameter modifications at the apparatus level, which then sends those command details to all appropriate nodes.

In one embodiment, as the apparatus gains object detection collections regarding the null hypothesis and when objects of previous unknown attributes are detected and better understood, the apparatus has the capability to run additional advanced analytics and machine learning algorithms, including those in the field of unsupervised learning, to create additional insights and quantifiable probabilistic measures for future object detection in the general area.

In one embodiment, nodes can coordinate to retrieve event collection data from other similar nodes within close proximity of its location to have an increased set of samples, both baseline and object detection collections, to use as part of analytics including but not limited to Z scoring, a basic metric in statistics of how probable or improbable a particular event is to happen. As an additional benefit, outlier event samples in common between these aggregated datasets can be considered to have a higher probability of being from a potential object of interest. Nodes can also coordinate sharing collection data with nodes remote from itself; outlier sample data from these nodes have a higher possibility of representing broader confounding radiation from environmental conditions making these outliers candidate for grooming or trimming in order to improve the accuracy of overall object detection.

In one embodiment, the apparatus contains a pluggable architecture for adding new nodes with additional specialized sensors capable of capturing collections of additional specific types of events that are determined to be of value to detect potential objects of interest in the encompassing medium. Types of passive sensors may include but are not limited to passive sensors for chemicals, sound, and weight and the various types of gamma detectors covering gas, solid state, and scintillators. Types of active sensors may include but not be limited to radar. A practical example could be the need to move an apparatus embodiment initially for detecting potential nuclear materials based upon general radiation to a new vehicle roadway and gathering an initial baseline on gamma and other radiation related to nuclear devices in the target location along the roadway. If it is deemed this is an insufficient approach to detect potential threats, as perhaps because new additions of lead casing or other types of shielding are potentially being used by terrorists, additional nodes that take measurements regarding correlated information about the vehicles such as weight and "sway" as the vehicles are made to stop can be added to the apparatus. A new baseline analysis is then conducted to gather, and correlate baseline levels of radiation, weight, and sway and these baselines are integrated into the node datasets along with the instructions for internode data communication during actual object detection sampling. Detection of potential objects of interest could be delegated down to the nodes which are given algorithms for integrating hybrid datasets from various event types. Another option as one familiar with the art of machine learning will appreciate, is by implementing but not limited to, unsupervised learning clustering or anomaly detection algorithms at the apparatus level against these baseline and object detection collections using technology such as Spark processing. If additional compute is needed, the apparatus can transmit all datasets to a public cloud environment such as Google GCP or Microsoft Azure, or perhaps a private cloud, to run these machine learning algorithms and have the results returned both to the apparatus and any other monitoring devices.

In one embodiment used to detect objects emitting gamma radiation, the apparatus can leverage both gaseous tube technology giving broad gamma detection coverage of the area along with solid state reverse biased "pin" diodes for more directional gamma detection, with the pin diodes located on curved surfaces on the apparatus. The gas based tube nodes maximize the area of volume for detecting gamma events across a broad energy spectrum and in a more omnidirectional detection, while the pin diodes allow for a more directional detection of gamma events. Placing the pin diodes on a curved surface as part of the apparatus allows the apparatus to coordinate collection analysis across those pin based nodes and derive not only evidence of an object of interest, but its approximate depth and location relative to the apparatus and encompassing medium through geometric analysis.

In one embodiment, the apparatus can be comprised of a plurality of nodes for detecting general events of interest and also a plurality of nodes for detecting specific types of events within the same family of event types. A specific example can include but is not limited to an apparatus with nodes capable of general gamma radiation event detection along with nodes capable of detecting radiation of specific energy levels. Within this apparatus there could exist three sets of specific gamma detection: nodes for detecting energy levels related to Uranium and those related to the decay of Uranium above radon; the decay of elements after radon down to stable lead; and energy levels related to cosmic radiation. Events indicating energy levels close to Uranium provide stronger evidence of an object such as a fossil close to the apparatus. Events at energy levels after radon indicate an object could be in the area but due to the drift of radon not necessarily as close. It is worth also mentioning that because the decay of many of the secondary heavy metals after radon have short half-lives, these may also provide directional evidence in terms of which direction to move the apparatus during the search since this evidence may grow fainter the closer you get to the object, and as the Uranium based evidence grows stronger. Finally the evidence of cosmic radiation would be used in a reductive manner to improve the apparatus's overall sensitivity to objects of interest.

The summary provided here is illustrative only and is not intended to be in any way limiting. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWINGS

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings those skilled in the art will recognize the sophisticated nature of the multi-node apparatus, in particular it's capabilities to compensate for the complexities of running probabilistic analysis of certain event types including not but limited to radiation detection from an indeterminate object such as a fossil while embedded in a medium such as complex layers of sandstone and mudstone within a formation. The invention manages to derive evidence of such objects while also providing compensating measures for confounding radiation within the medium itself and also from the surrounding environment.

DETAILED DESCRIPTION OF THE PREFERRED EMBODIMENTS

As will be appreciated by one skilled in the art, aspects of the present invention may be embodied as a physical apparatus, method or computer program product implementing capabilities both on the event sensing apparatus and on supplemental devices used in conjunction with the apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Many of the functional units described in this specification have been labeled as modules, in order to more particularly emphasize their implementation independence. For example, a module may be implemented as a hardware circuit comprising custom electronic circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

It is noted and anticipated that although the invention is illustrated in the following figures, flow charts, and simple user interface diagrams, various aspects and features of the disclosed method may be modified when configuring the invention herein. As such those skilled in the art will appreciate the descriptions, depictions, and diagrams are merely set forth in this disclosure to portray examples of preferred modes and are not to be considered limiting in any manner.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
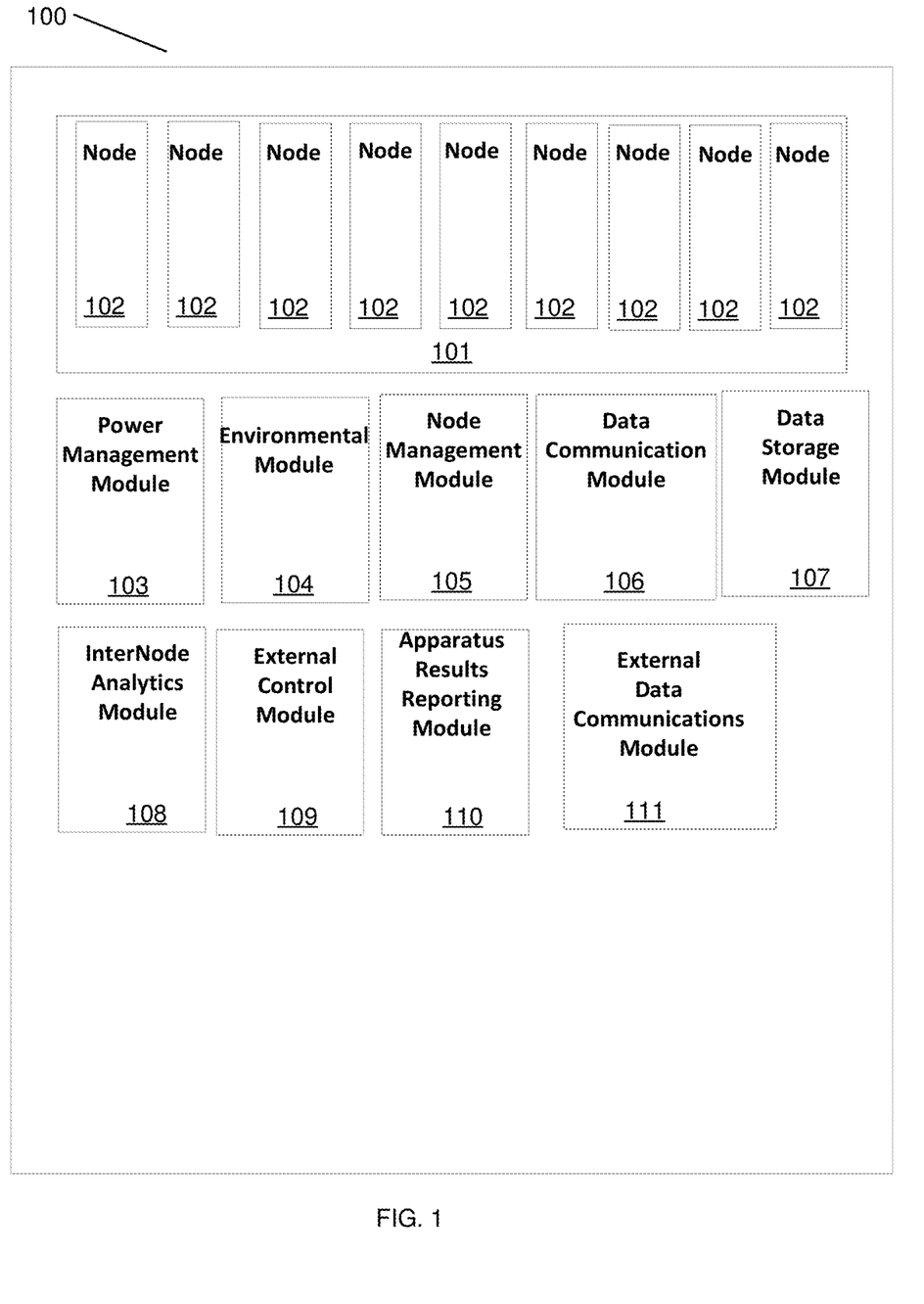
FIG. 1 depicts a schematic representation of the typical apparatus instrumentation, including the plurality of event detecting nodes, and also all the supportive apparatus components to support the ability of all nodes to generate independent analysis for the potential of an indeterminate object embedded in the encompassing medium, in accordance with the present invention.

There is seen in FIG. 1 the overall architecture and modules for the apparatus 100, including the plurality of independent event detecting nodes 102, and also all the apparatus components to support the ability of all nodes that generate independent analysis for the potential of an indeterminate object embedded in the encompassing medium. The event sensing nodes, or more simply referred to as the nodes 102, are encapsulated and managed by a node aggregator module 101 which manages and delivers the centralized needs for the nodes including but not limited to data communications and redundant power that can range from a few volts up to several hundred volts for gaseous tubes capable of sensing events such as gamma and beta radiation. The power management module 103 provides adequate levels of power appropriate for the type of event detection that is occurring, along with power for all the digital and analog circuitry within the nodes and the apparatus, and also provides but is not limited to power redundancy for the nodes and the apparatus. The environmental module 104 is capable of delivering to all said nodes data as to what the specific environmental conditions are during usage including but not limited to GPS location, time, elevation, temperature, and humidity for the apparatus while the apparatus is engaged in collection gathering, and such data can then be associated as valid metadata regarding any taken baseline or event detecting collection. Such metadata may be useful during analysis in many ways, including but not limited to using the metadata to partition differential analysis into grouping such as managing background collections into grouping where there is more convergence on baseline collection results based upon ranges of elevation; the apparatus would then make the decision to tell all nodes to gather and manage baselines within those ranges of elevation and then perform differential analysis for any given object detection collection using the appropriate elevation baseline. The node management module 105 monitors decisions the apparatus has made regarding balancing quality concerns about collections taken and issues commands to all said nodes regarding but not limited to expected sampling time duration, number of samples per said collection, and when to initiate the gathering of said baseline collections and said object detection collections. The data communications module 106 is capable of receiving data from the nodes including but not limited to all samples gathered as part of a collection, along with each node's differential quantitative analysis of the evidential probability of a the indeterminate object being detected. The data storage module 107 stores all node results across a time horizon including but not limited to all gathered node baseline and object detection collections, and all analytical results gathered from the nodes. The internode analytics module 108 provides capabilities including but not limited to applying Z scoring for internode aggregated collections for nodes of the same event type along with grooming said baseline collections and said object detection collections for quality concerns based upon but not limited to Quantile-Quantile (QQ) plot analysis, which those skilled in the art of statistical analysis will appreciate is one of the most common ways of comparing a distribution of probabilities to a well formed normal distribution. This module may also apply but not be limited to various covariant and multivariate statistical and machine learning algorithms across collections for nodes with different event types or varying metadata values, or various feature extraction and learning techniques including but not limited to neural networks. The external control module 109 provides communications abilities to an external device such as but not limited to a smartphone or tablet, using network protocols such as but not limited to telnet, for sending instructions to said apparatus such as but not limited to when said nodes should run said baseline collections, or when the apparatus has been placed in a said specific location near said encompassing medium and all nodes are instructed to take object detection collections, and deliver sets of analytical results such as but not limited to Z scoring back to said external device. The apparatus results reporting module 110 provides the capability of numerical display, color, or sound indicating but not limited to communicating node real-time analytical results where a high probability of an indeterminate object has been determined to be highly likely within range of the apparatus. The external data communications module 111 provides the capability of transmitting all said node and apparatus collections and analytical results to persistent memory residing on but not limited to public or private compute cloud infrastructures, or other compute servers that have been brought into the general area of interest, where said transmittal is conducted via industry standard protocols such as but not limited to wireless Ethernet and TLS secure protocols.

Figure 2:
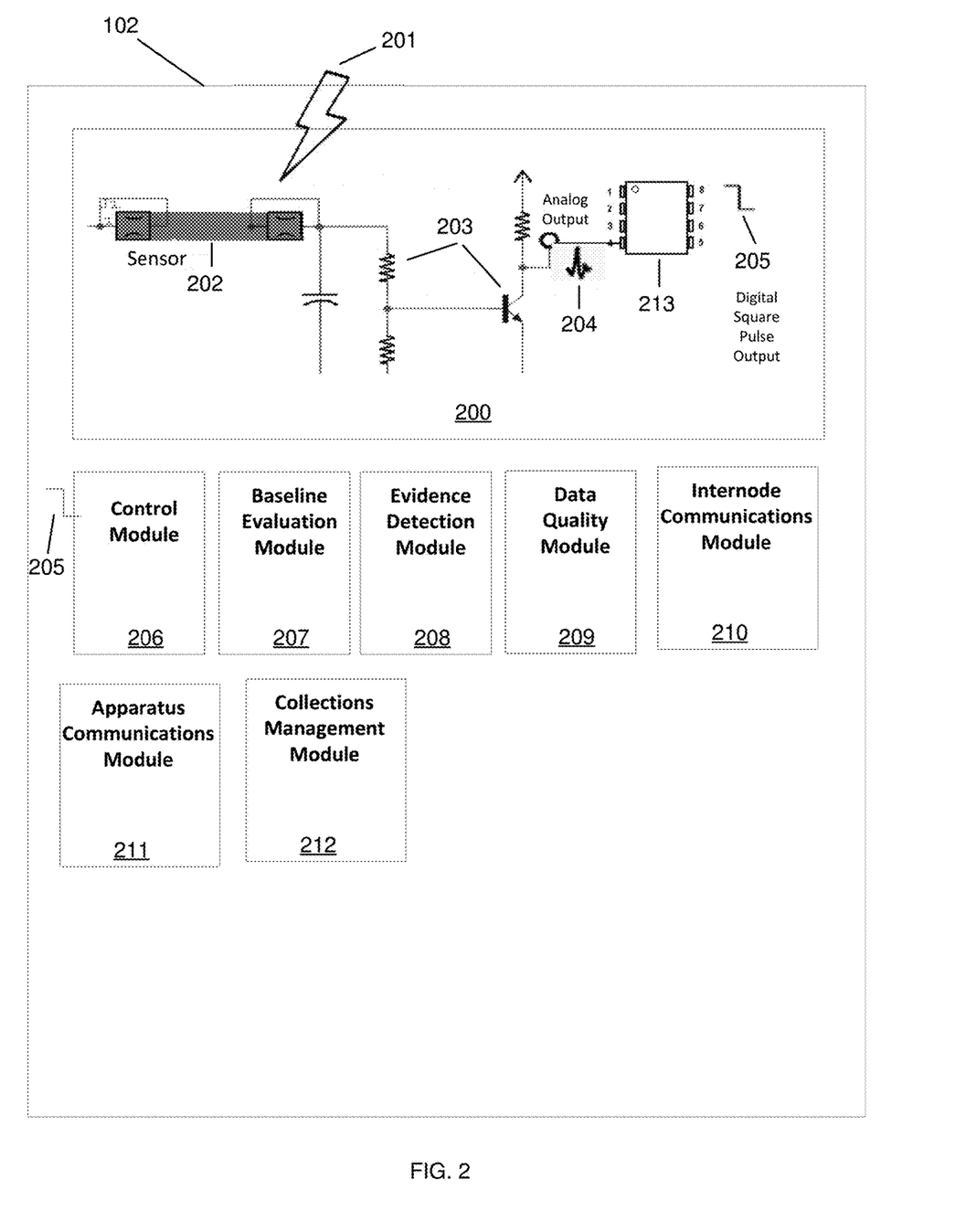
FIG. 2 depicts a schematic representation of a typical node, including having the needed sensor along with supportive analog and digital circuitry to detect events which may be emitted from the indeterminate object.

There is seen in FIG. 2 the overall architecture and modules for an event detecting node 102. The event detection module 200 is capable of detecting events 201 such as but not limited to radiation emitted from various objects or environments including indeterminate objects of interest, or the encompassing medium, or even the overall environment the apparatus is operating in. Within the event detection module the actual sensor 202 is encapsulated along with any needed analog 203 circuitry to amplify and to condition the evidence 204 emitted by the sensor that the event occurred, and then any needed digital circuitry 213 required to further groom and amplify the evidence into a digital signal 205 that can be recorded as a discrete event for incorporation into a timed sample. The control module 206 receives the digital signals representing a detected event and also manages the parameters for how each node will quantify sampling time duration such as but not limited to events-per-second, and the number of samples for a collection to be evaluated, such as but not limited to sixty samples per collection, and then records the results for each sample and for each event collection. The baseline evaluation module 207 allows each node to independently retain its own said collection and analysis on what comprises a baseline level of event activity for baseline collections when no said object of interest is within a generally targeted area where there will eventually be specifically targeted areas where object detection collections will be taken. The evidence detection module 208 allows each node to independently generate object detection collections for comparison to said baseline collections and to conduct quantifiable differential analysis regarding whether event activity occurring within any given said object detection collection indicates, based on differential analysis compared to the baseline collection, evidence of a said indeterminate object of interest is within said specifically targeted area. Such differential analysis can include but is not limited to Z scoring or other traditional statistical approaches such as analysis of the Poisson distribution for the baseline and object detection collections. The data quality module 209 allows each node to evaluate the possibilities that said baseline collections and said object detection collections have gathered consistent data within their domains, including analysis techniques including but not limited to QQ plot analysis. The internode communications module 210 allows nodes to request event baseline and object detection collections from nodes in close proximity or remote proximity thus allowing said enhanced data quality module to additionally apply various data grooming algorithms to said node's object detection collections such as but not limited to giving more weight and validity to outlier samples held in common with nodes in close proximity as being perhaps evidence of a potential indeterminate object, and less weight to those outlier samples from nodes in remote proximity as perhaps being confounding events from the encompassing medium or other atmospheric event activity. The apparatus communications module 211 is capable of transmitting to the apparatus all baseline collections, object detection collections, and analytical results along with sending and receiving commands and parameters for the control module. The collections management module 212 allows each said node to retain said baseline collections and said object detection collections along with appropriate metadata about the collections which can be useful for differential analysis including but not limited to time, date, GPS, temperature, elevation, and other environmental conditions.

Figure 3:
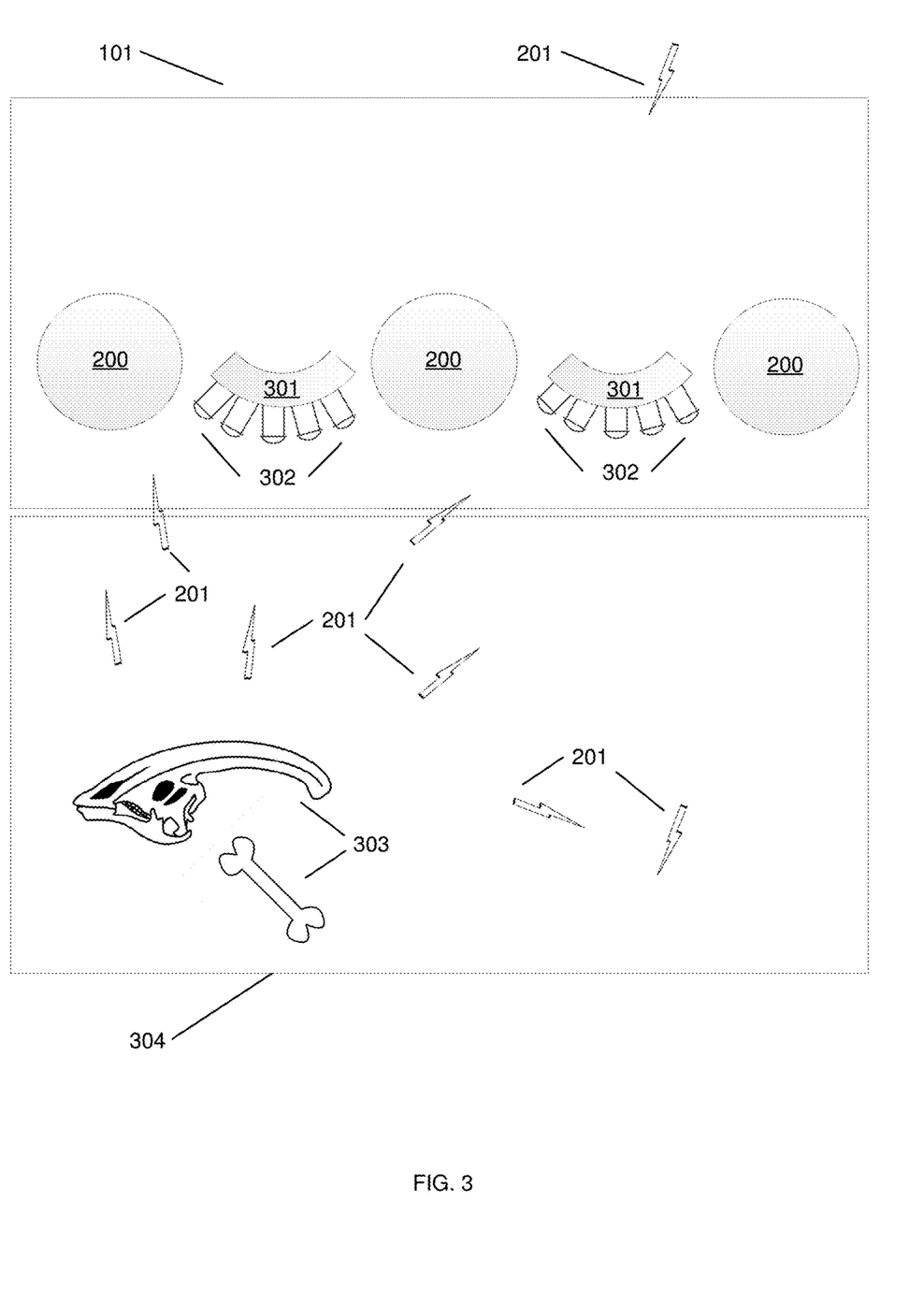
FIG. 3 depicts a schematic representation of the apparatus using both omnidirectional and directional nodes located on both flat and curved surfaces, with the apparatus placed above an encompassing medium where indeterminate objects may be evidentially detected. This embodiment is used in order to improve the ability of the apparatus to provide better directional guidance as to the potential placement of indeterminate objects of interest within the encompassing medium.

There is seen in FIG. 3 in one embodiment there is the usage of broad energy gamma event sensing tubes 200 along with more directional gamma sensing pin diodes 302 located on the curved surface 301 (for clarity of the diagram only the sensors are shown in the node aggregator module 101). Those skilled in the art of radiation science will appreciate that events such as gamma radiation or beta radiation 201 may originate from many sources and not just from indeterminate object or objects of interest 303 in the encompassing medium 304. Generally, the gaseous tubes 200 are more sensitive overall to any and all gamma and beta radiation including confounding radiation from the encompassing medium or the environment, but those skilled in the art of radiation science, statistical analysis, and data science will appreciate that given enough samples across time, the gaseous tubes closer to the object of interest which is giving off somewhat or slightly higher levels of radiation than the encompassing medium, will over time accrue samples with evidentially detectable differences as opposed to the gaseous tubes that are farther away since radiation tends to drop off as the square of the distance from the source of radiation thus leveraging a key aspect of the apparatus namely the multiple nodes all capable of independent gathering and independent differential analysis of its own baseline collections to its own event detecting collections for a specific event type. Since the indeterminate objects of interest are truly unknown in terms of size and their actual depth, simply having a general sense that one gaseous tube showing stronger evidence for an object in an approximate direction may not give the ideal amount of guidance to the user of the apparatus as to how deep to excavate to find the object. In this case, even though the pin diodes may take more time to accrue a reasonably strong amount of evidence, under these circumstances the apparatus may instruct these pin diodes to take enough samples such that the pin diodes that are physically aligned with the objects will evidentially detect the objects whereas the other pin diodes will constantly have object detection collections that are akin to their baseline collections. The pin diodes which then are physically aligned then allow the apparatus to use those pin diodes known orientations on the curved surface to use standard geometry to triangulate the most likely depth and position for the embedded object.

Figure 4:
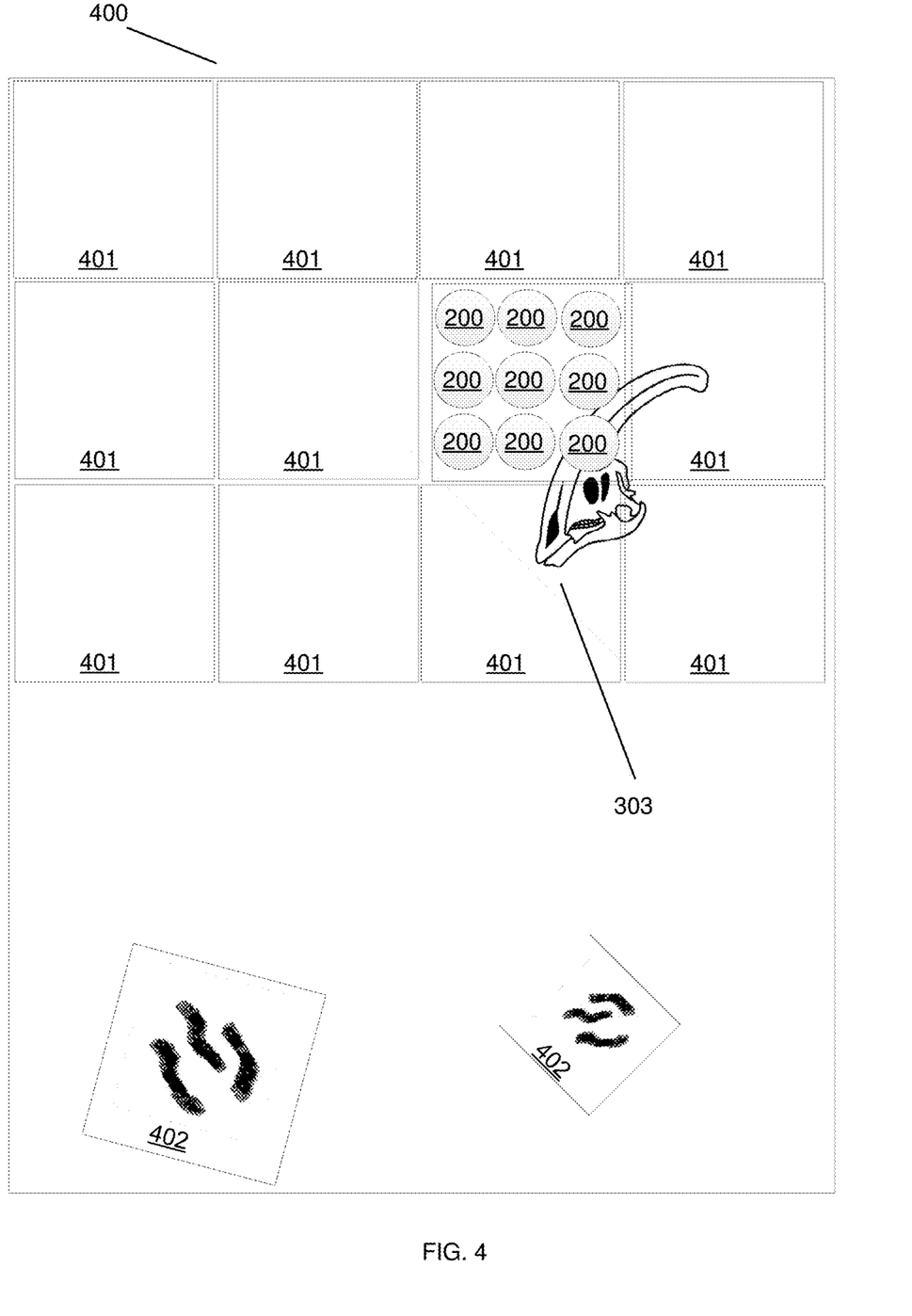
FIG. 4 depicts an overhead view schematic representation of the nodes of apparatus located in a specific area of interest sitting on top of the encompassing medium, where an indeterminate object of interest may be located. The apparatus nodes are in one specific area of interest located amongst a plurality of locations of interest, and these locations of interest are located in a general area of interest which also includes specific areas known not to have fossils and thus are useful for generating baseline collections.

There is seen in FIG. 4 an example of practical usage of the multi-node apparatus. The researcher upon reaching a general area of interest 400 where there may be a suspected indeterminate object or objects of interest in the encompassing medium would first set the apparatus into a location or locations he or she is strongly certain no such objects are embodied such as but not limited to those locations that have already been explored 402 and found to contain no objects. Such locations allow the nodes to model and retain a set of converged baseline collections based upon the quality attributes encoded into the apparatus using techniques such as but not limited to QQ plot analysis, and outlier sample analysis. With robust baseline collections established, the researcher then may start leveraging the apparatus's capability to derive evidence of indeterminate objects by placing the apparatus within a set of collocated specific areas of interest 401. Those skilled in the art of radiation science will appreciate that for many of the specific areas of interest where there are no indeterminate objects within a certain distance of the apparatus, the nodes (depicted as just sensors 200 for brevity and clarity) will detect little differential evidence between its baseline collections and (as an example) the object detection collection it gathered in the top left corner of the adjacent specific areas of interest 401. As the apparatus is moved across the adjacent specific locations of interest, those skilled in the art of radiation science, statistical analysis, and data science will appreciate that assuming indeterminate objects of interest emit a slightly higher level of the events, at least a percentage of the nodes in the apparatus, given the appropriate parameters for the nodes in terms of sampling and collections, will be able to provide quantifiable evidence (perhaps even using basic statistical measure such as Z scoring) that an indeterminate object of interest 303 is being detected within the encompassing medium using the area of interest where the diagram currently shows the apparatus and its nodes. Those skilled in the art of radiation science will appreciate that, again assuming the apparatus nodes have gathered valid baseline collections, there will be a percentage of nodes that will almost certainly be indicating evidence of an embedded object when placed in any of the lower-right specific areas of interest. There is the possibility based upon the vagaries of gamma radiation emissions, that some of those nodes one might expect to show strong evidence for an embedded object may not do so based upon the vagaries of gamma radiation behavior. Aggregated results based upon adjacent nodes, along with other techniques described in this specification regarding outlier sample analysis and various statistical approaches can significantly reduce the impact of this gamma radiation vagary to provide high fidelity object detection in the encompassing medium.

Figure 5:
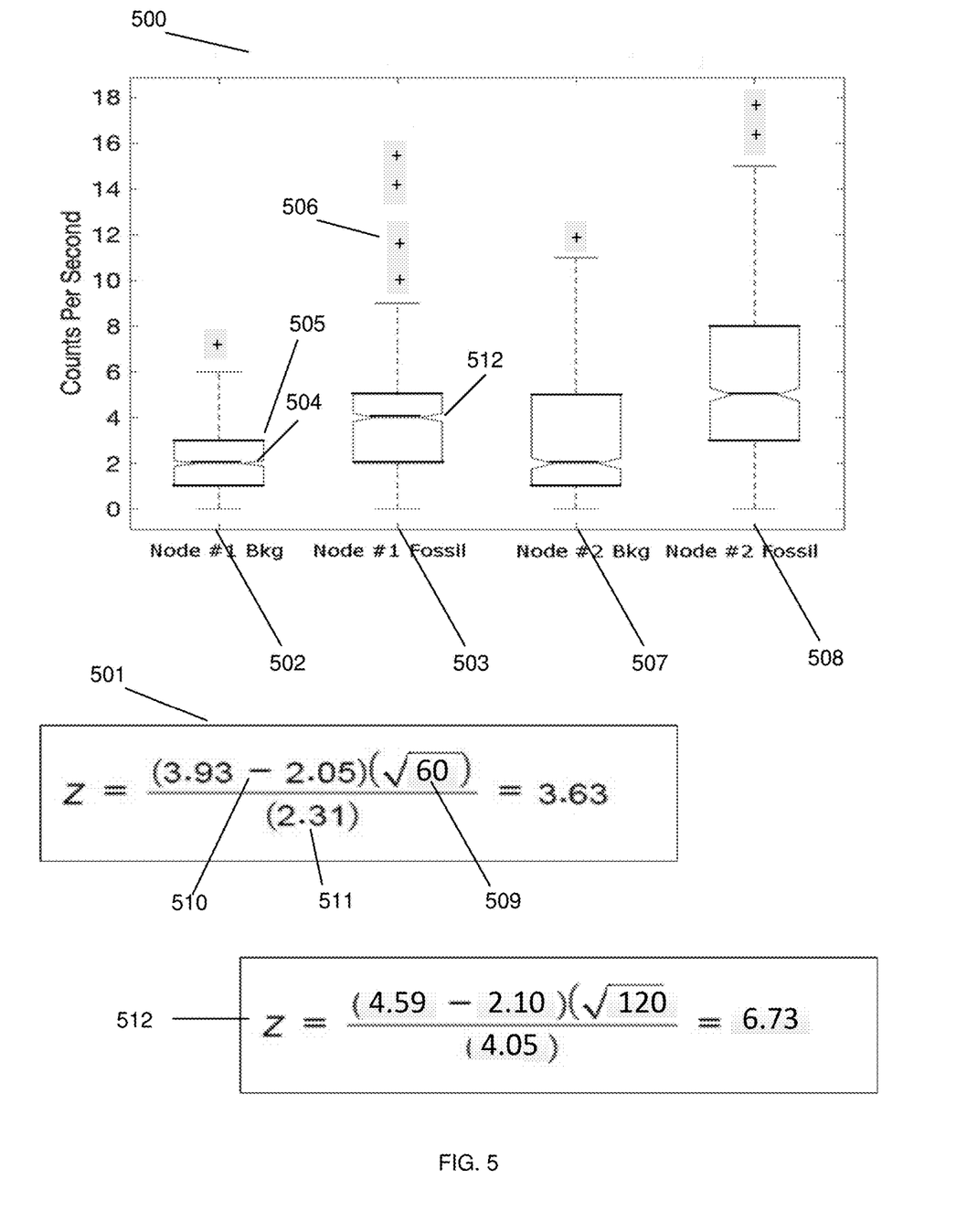
FIG. 5 depicts traditional statistical analysis from a plurality of nodes in terms of box plots and Z scoring, leading to very strong but not absolute evidence of an object being located in the encompassing medium; the nodes were collecting event results as part of a 60 sample collection. This is merely the basic type of analysis process whereas the invention supports many additional sophisticated differential analytical methodologies, including but not limited to machine learning and other automatic algorithms. Although it is basic, the Z scoring is still a valuable metric as it can quantify how likely an object is to be present within a specific area of an encompassing medium.

There is seen in FIG. 5 an example of differential analytics from two nodes of the apparatus, as demonstrated by a straightforward boxplot 500 and a standard statistical Z score 501. This usage of the apparatus occurred within the "one-eleven ranch" formation in the state of Arizona, and after excavation the indeterminate object was realized as the femur of an extinct species of Camelops. The one-eleven ranch formation is nearly three million years old and much of the matrix (soil, sand, stone, etc.) within the formation has slightly more Uranium than other areas on the planet; the fossils encompassed in the formation have accrued this Uranium as the collagen lattice binding the microcrystalline bone hydroxyapatite was replaced with new fluorapatite which readily absorbs and concentrates uranium during crystallization, resulting in the encompassed fossil now emitting up to 300% more gamma radiation than the surrounding matrix (e.g. the encompassing medium). Based upon analysis of the matrix and typical one-eleven ranch fossils in a controlled lab environment, the apparatus configured itself to create collections of 60 samples 509 based upon said lab environment testing where the apparatus was able to derive a 95% confidence when a one-eleven ranch fossil weighing one hundred grams was placed under thirty centimeters of matrix that had been collected from one-eleven ranch, where a sample is the number of gamma events per second. The baseline collection for node #1 502 was then taken in the field, sensing an average of 2.05 gamma events per second 504 with 75% of the samples 505 detecting less than 3 gamma events per second. The standard deviation for the baseline collection 511 was 2.31 events per second. When the apparatus was placed in the specific area of interest that ended up discovering the Camelops femur an object detection collection was taken by node #1 503 where the average gamma events 512 across the sixty samples in that object detection collection rose to 3.93 counts per second. Using traditional Z scoring and comparing the differences in the averages 510 the resultant Z score was 3.63 which yielded a quantifiable result that one could confidently reject the null hypotheses that there was no indeterminate object generating additional gamma events 99.9% of the time. This was an exemplar situation since the one-eleven ranch formation has quite radioactive fossils as compared to the encompassing medium and in this case the Camelops femur was quite large, with a good deal of it within several inches of the surface of the matrix then tilting at an angle into the matrix. Had the confidence level been much lower, say perhaps in the 60% range, but still a confidence level that started to show promise, one skilled in the art of engineering and statistical analysis can appreciate how the aggregation of data from collocated nodes for both baseline collections 507 and object detecting collections 508 across the multi-node apparatus could help create a larger collection for even basic techniques like Z scores. One can see how rapidly the Z scoring and thus quantified probabilistic object detection rises as samples across collated nodes 512 are used as part of further analysis by the apparatus or when such aggregated analysis is delegated down to the nodes depending on the embodiment of the invention. It will also be evident to one skilled in the art of statistical analysis that such a multi-node architecture which allows for the generation of large datasets across the nodes supports many other techniques for grooming the data for analysis. In this exemplar case it can be seen that there were few outlier samples in the baseline collections whereas the object detection collections that were taken that helped detect the Camelops femur yielded a high number of outlier samples 506 with bursts of up to 14 gamma events per second. In this exemplar case because there is outlier consistency across collocated baseline collections and also collocated object detection collections, the apparatus instructed the nodes to include outlier data in its analysis. Other options for grooming the sample data in the collections could have included eliminating from the collections outlier samples that had a common profile between the baseline and event detection nodes, or performing analysis of outlier behavior from collated nodes versus remote nodes that were less likely to have detected the object of interest. It is worth repeating this was an exemplar example and one which lent itself to a discussion of multi-node capabilities and opportunities. The usage of Z scoring while powerful and practical is only one example of how differential analysis could be conducted using baseline and object detection collections gathered across nodes. Other differential analysis for one event type can include but is not limited to the Poisson distributions regarding the baseline and object detection collections. For embodiments where the apparatus has nodes collecting various event types, in addition to Z scoring and Poisson distributions per event type those skilled in the art of data science will appreciate that many covariant and multivariate statistical and machine learning algorithms may be used such as but not limited to multi-variable regression analyses, principle component analysis, and other differential techniques often used to support dimensionality reduction while also determining the key event types that can be quantified as being deterministic of a potential indeterminate object. Those skilled in the art of data science will also appreciate that the generation of such evidential data based upon a plurality of event types having potentially complex correlations between the event types lends itself to analysis by various feature extraction and learning techniques including but not limited to neural networks.

Figure 6:
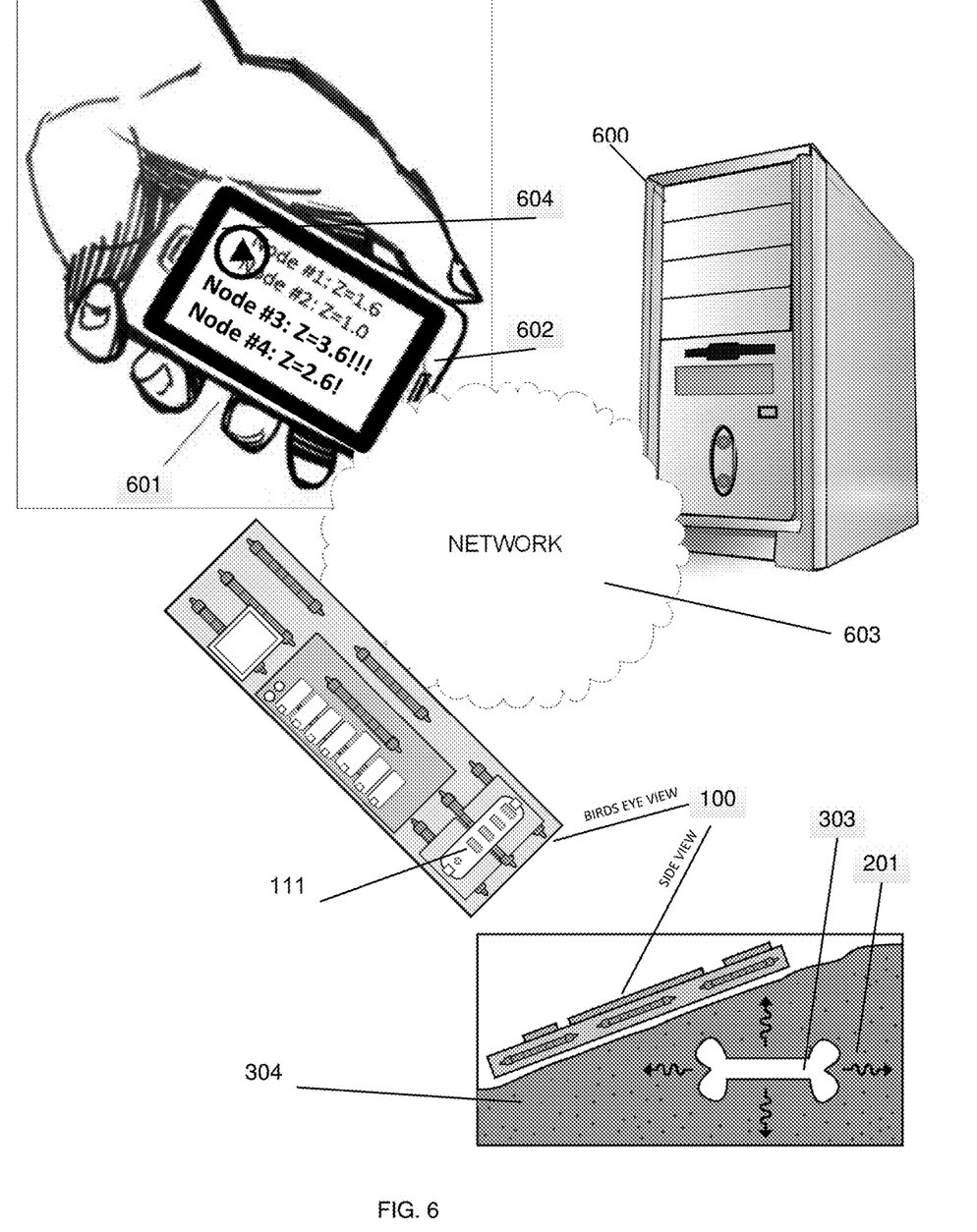
FIG. 6 depicts a schematic representation of the apparatus using standard networking protocols to deliver key results to a hand-held device regarding recently derived evidence of an indeterminate object and also to receive further instructions for proceeding with gathering collections. The schematic also represents, the apparatus delivering all collections to a cloud based infrastructure both for persistence and for further analytical processing.

There is seen in FIG. 6 a schematic representation of the apparatus 100 and its external data communications module 111 to leverage standard networking protocols 603 including but not limited to wireless Ethernet to deliver key results to a hand-held device 602 under direct control of the user 601 regarding recently derived evidence of an indeterminate object. While many embodiments of the apparatus have onboard controls for allowing the user to trigger baseline and object detection collections, the hand-held device can also be used to transmit to the apparatus further instructions for proceeding 604 with gathering collections. The handheld device can include but not be limited to being a smart phone running a simple telnet client, or a fully developed application leveraging any standard networking protocols. The schematic also represents the apparatus delivering all collections to a public or private cloud based infrastructure 600 both for persistence of all collections and analytical results along with any further analytical processing that is desired.

Figure 7:
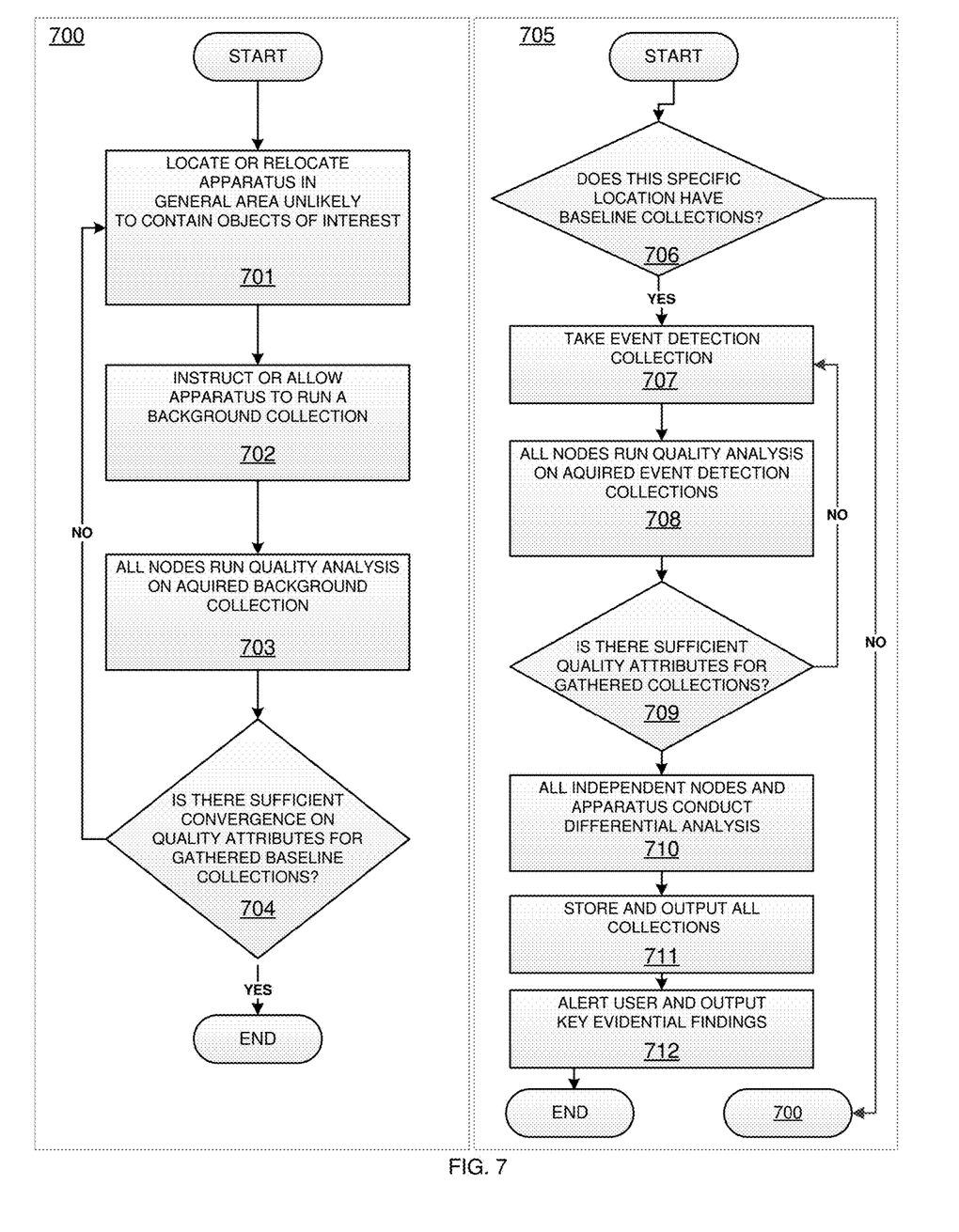
FIG. 7 depicts the process for the apparatus gathering baseline collections and also object detection collections.

There is seen in FIG. 7 a set of process diagrams both for the method of having all nodes in the apparatus capture baseline collections 700 and also for capturing object detection collections 705. To initiate baseline collections 700 the user first must locate at least one if not a plurality of locations with the general area of interest 701, such as a geological formation as the potentially encompassing medium, that it is highly unlikely to have an artifact or natural object of interest embedded and encompassed therein. The user ether via controls located on the apparatus or via an internal control device such as a smart phone in network communication of the device instructs 702 the apparatus and all its nodes to take a baseline collection. After completion of a baseline collection all nodes then may perform quality analysis 703 such as but not limited to QQ plot analysis to make sure the collections in the sample are unlikely to have poor data that might skew results when used to conduct differential analysis against the upcoming object detection collections. Embodiments of the apparatus will have a desire to run a plurality of baseline collections 704 to look for consistency and convergence between the collections; this also allows the user of the apparatus to move said apparatus to several locations 701 unlikely to contain embedded objects, and any errant baseline collections that run contrary to convergence can be removed from consideration as a baseline and also flagged for later investigation as a collection that may actually be detecting an encompassed indeterminate artifact or natural object. There can be seen as part of gathering object detection collections 705 that the first activity is for the apparatus to confirm it has valid baseline collections 706 for the general area such as the formation, along with any desired metadata for governing the baseline collection usage such as but not limited to elevation or temperature; if such baseline collections do not exist the user is instructed to redirect and gather the needed baseline collections 700. If the appropriate baseline collections do exist, the apparatus proceeds with instructing all nodes to gather an object detection collection for the specific area of interest 707. Once all nodes report they have gathered an appropriate object detection collection they also all then run the appropriate quality algorithms 708 against said collection including but not limited to QQ plot analysis. If any of the nodes report to the apparatus concerns about their object detection collections to the apparatus 709, the apparatus may choose to instruct some or all the nodes to rerun their object detection collection for that specific area of interest 707. If instead the apparatus determines that all or a sufficient number of nodes have gathered object detection collection of sufficient quality all nodes are then instructed to conduct the appropriate differential analysis comparing baseline and object detection collections and/or any requested internode or apparatus level differential analytics 710. All nodes store their collections and results both within the node storage and also the apparatus storage along with outputting any and all collection and analytical results to any networked devices 711. The apparatus them alerts the user by both using onboard modules for displaying textual results and graphics or generating any appropriate auditory alerts regarding any key evidential findings, along with also outputting these key alerted findings to any networked devices 712.

What is claimed:

1. An apparatus for deriving evidence of an embedded indeterminate object emitting radiation in an encompassing medium, the apparatus comprising:
   a) a plurality of event detecting nodes each containing an event detection module comprising supportive analog and digital circuitry configured to (i) detect radiation energy emitted by the object, the radiation energy having an energy frequency or an energy frequency range, and (ii) convert the radiation energy into discrete digital events representing the radiation energy emitted by the indeterminate object;
   b) said nodes each comprising a control circuit configured to (i) establish event collection parameters for an event collection including time duration per sample and number of samples for each of the event collections, and (ii) record said event collection parameter into a non-transitory computer-readable medium or transmit said event collection parameters through a communication network;
   c) said nodes each comprising a baseline evaluation circuit configured to (i) allow each said node to independently construct a respective baseline collection comprising a respective baseline level of event activity, (ii) collect and make said baseline collection available to each said node, and (iii) record said baseline collection into the non-transitory computer-readable medium or transmit said baseline collection through the communication network;
   d) said nodes each comprising an evidence detection circuit configured to (i) allow each said node to independently generate object detection collections for comparison to said baseline collection and (ii) conduct quantifiable differential analysis using statistical or machine learning algorithms configured to utilize said baseline collection and said object detection collections to derive the evidence of the indeterminate object within a specific area, and (iii) record said object detection collections and the quantifiable differential analysis to the non-transitory computer-readable medium or transmit said object detection collections and the quantifiable differential analysis through the communication network;
   e) said nodes each comprising a collections management circuit configured to allow each said node to retain said baseline collection, said object detection collections, the quantifiable differential analysis, the evidence, and collection metadata related to said baseline collection and said object detections collections, wherein said collection metadata comprises at least one of: time, date, global position latitude and longitude, temperature, or elevation, and wherein said collection management circuit is configured to record into the non-transitory computer readable medium or transmit through the communication network at least one of: (i) said baseline collection, (ii) said object detections collections, (iii) the quantifiable differential analysis, (iv) or said collection metadata;

wherein the apparatus is configured to derive the evidence of the indeterminate object in the specific area utilizing said baseline collection and said object detection collections.

2. The apparatus of claim 1 further comprising:

a) a node aggregator circuit that provides integration between any of said nodes and all other said circuits and module within the apparatus for common services comprising at least one of: power commands, data transfer, or control commands, and wherein the node aggregator circuit is further configured to transmit said common services through the communication network or record said common services into the non-transitory computer-readable medium;

b) a power management circuit to provide appropriate levels of power adequate for the type of event detection that is occurring, along with power for all the digital and analog circuitry within said node and said apparatus;

c) an environmental circuit configured to (i) deliver to all said nodes during usage the environmental conditions comprising at least one of: global position latitude and longitude, time, or elevation for said apparatus while engaged in gathering said baseline collection or said object detection collections, and (ii) record said environmental conditions into the non-transitory computer-readable medium or transmit said environmental conditions through the communication network;

d) a node management circuit configured to (i) issue commands to said nodes, said commands comprising at least one of: sampling time duration, number of said samples per said collection, initiation and halting of collection of said baseline collection, or initiation and halting of collection of said object detection collections, and (ii) record said commands into the non-transitory computer-readable medium or transmit said commands through the communication network;

e) a data communications circuit configured to (i) receive data from said nodes comprising at least one of: said baseline collection and said object detection collections, the quantifiable differential analysis, or the evidence, and (ii) record the data into the non-transitory computer-readable medium or transmit the data through the communication network;

f) a data storage circuit capable of (i) storing the data from all said nodes during all usage of the apparatus comprising at least one of: said baseline collection, said object detection collections, or said nodes quantifiable differential analysis, and (ii) record the data into the non-transitory computer-readable medium or transmit the data through the communication network;

g) an internode analytics circuit capable of (i) aggregating said baseline collection into aggregated baseline collections and said object detection collections into aggregated object detection collections from co-located ones of said nodes for usage in aggregated analysis using the statistical or machine learning algorithms configured to utilize said aggregated baseline collections and said aggregated object detection collections to derive the evidence of the indeterminate object within the specific area based upon the quantifiable differential analysis, and (ii) record said aggregated baseline collections and said aggregated object detection collections and the evidence into the non-transitory computer-readable medium or transmit said aggregated baseline collections and said aggregate object detection collections and the evidence through the communication network;

h) said nodes each comprising a data quality module allowing each said node to (i) derive quality metrics for at least one of: said baseline collection, said aggregated baseline collections, said object detection collections, or said aggregated object detection collections utilizing at least one of: Quantile-Quantile (QQ) analysis, outlier sample analysis, or other analysis capable of comparing collections of data, and (ii) record said quality metrics into the non-transitory computer-readable medium or transmit said quality metrics through the communication network;

i) an external control circuit configured to provide communications to an external electronic device using computer network protocols for sending instructions to the apparatus where said instructions comprises at least one of: (i) when said nodes should run said baseline collection, or when to take said object detection collections, and (ii) delivering said baseline collection or said object detection collections back to said external device, and (iii) record said instructions into the non-transitory computer-readable medium or transmit said instructions through the communication network; and j) an apparatus results reporting circuit comprising at least one of: numerical display, color, or sound indicating the evidence of the indeterminate object emitting radiation in the encompassing medium and where said apparatus results reporting circuit is capable of using the communication network;

wherein the apparatus is configured to derive the evidence of the indeterminate object in the specific area utilizing one or more of the additional circuits or module.

3. The apparatus of claim 2 further comprising:

a) said data quality module within each said event detecting node enhanced to be capable of (i) determining and tagging said samples, either for said baseline collection or for said object detection collections, that are suspect as being improbable or as having an excess of outlier event samples and thus not to be included in said node or the apparatus said quantifiable differential analysis, and (ii) record one or more of said tags and said baseline collection and said object detection collections into the non-transitory computer-readable medium or transit one or more of said tags and said baseline collection and said object detection collections through the communication network;

b) an internode communications circuit within each said node capable of (i) requesting said baseline collection or said object detection collections from said nodes in close proximity or remote proximity thus allowing said enhanced data quality module to additionally apply data grooming to said collections leveraging said tagged samples, and (ii) generating said aggregated baseline collections and said aggregated object detection collections from groomed said collections and (iii) record said baseline collection, said aggregated baseline collections, said object detections collections, and said aggregated object detection collections into the non-transitory computer-readable medium or transmit said baseline collection, said aggregated baseline collections, said object detection collections, and said aggregated object detection collections through the communication network;

c) said baseline evaluation circuit and said evidence detection circuit enhanced within each said event detecting node to be capable of (i) generating and retaining said aggregated baseline collections and said aggregated object detection collections based upon said enhanced internode communications circuit, and (ii) record said aggregated baseline collections and said aggregated object detection collections into the non-transitory computer-readable medium or transmit said aggregated baseline collections and said aggregate object detections collections through the communication network;

d) said evidence detection circuit within each said node enhanced to be capable of (i) leveraging said aggregated baseline collections and said aggregated object detection collections to conduct quantifiable differential analysis using the statistical or machine learning algorithms configured to utilize said aggregated baseline collections and said aggregated object detection collections to derive the evidence of the indeterminate object or objects within the specific area based upon the quantifiable differential analysis, and (ii) record said aggregated baseline collections and said aggregated object detection collections and the evidence to the non-transitory computer-readable medium or transmit said aggregated baseline collections and said aggregated object detection collections and the evidence through the communication network;

e) said baseline evaluation circuit within each said node enhanced to be capable of (i) managing a plurality of said baseline collection as baseline collections and determining a specific said baseline collection to be used when appropriate based upon increased collection metadata comprising at least one of time of day, global position latitude and longitude, or environmental conditions as reported to said node from the apparatus's said environmental conditions circuit comprising at least one of: environmental temperature, wind, axial positioning of the apparatus, elevation, or humidity, and (ii) record said baseline collections and said collection metadata into the non-transitory computer-readable medium or transmit said baseline collections and said collection metadata through the communication network;

f) said data quality module within each said node enhanced to be capable of (i) independently declare a specific said event baseline collection or said object detection collections taken is invalid and alert a user said apparatus should not be moved during a retake collection session or instead indicate said apparatus should remove said event baseline collection or said object detection collections as part of a broader analysis for a specific time period due to said node collection quality issues, and (ii) record said alerts and said baseline collection and said object detection collections into the non-transitory computer-readable medium or transmit said alerts and said baseline collection and said object detection collections through the communication network;

g) said data quality module within said node enhanced to be capable of (i) requesting said apparatus to modify parameters for all said nodes comprising at least one of: the number of said event samples taken per said event baseline collection, the number of said event samples taken per said object detection collections, or the unit of time per said sample, in order to improve the quality of said event baseline collection or said object detection collections being collected, and (ii) record said parameters and said baseline collection and said object detection collections into the non-transitory computer-readable medium or transmit said parameters and said baseline collection and said object detection collections through the communication network;

wherein the apparatus is configured to derive the evidence of the indeterminate object in the specific area utilizing one or more of the additional circuits or module.

4. The apparatus of claim 2 further comprising:

a) said node management circuit within said apparatus enhanced to be capable of (i) communicating to all said nodes a specific object detection collection timeframe or actual said object detection collections that represents a previous successful object detection, and (ii) record said specific object detection timeframes or said object detection collections into the non-transitory computer-readable medium or transmit said specific object detection collection timeframes or said object detection collections through the communication network;

b) said baseline evaluation circuit and said evidence detection circuit within each said node enhanced to be capable of (i) generating differential comparison evidence of future said object detection collections and those that led to a successful object detection in the specific area of interest previously, and (ii) recording said differential comparison evidence into the non-transitory computer-readable medium or transmit said differential comparison evidence through the communication network;

wherein the apparatus is configured to derive the evidence of the indeterminate object in the specific area utilizing one or more of the additional circuits.

5. The apparatus of claim 2 further comprising:

a) one or more said nodes comprising supportive analog and digital circuitry placed on both flat and curved surfaces, either concave or convex, integrated into the apparatus, configured to detect radiation energy from the indeterminate object comprising one of an energy frequency or an energy frequency range and convert said radiation energy into discrete digital events representing radiation energy emission with a higher probability of one specific direction versus other directions;

b) said internode analytics circuit enhanced to be capable of (i) coordinating said event collection analysis across said nodes to derive the evidence of the potential depth and location of the indeterminate object, and (ii) recording the evidence of the potential depth and the location into the non-transitory computer-readable medium or transmit the evidence of the potential depth and location through the communication network;

wherein the apparatus is configured to derive the evidence of the indeterminate object in the specific area utilizing one or more of the additional circuits.

6. The apparatus of claim 2 further comprising:

a) said evidence detection circuit within each said node enhanced to be capable of (i) retaining all said object detections collections within the specific area of interest across a duration of time and conducting the quantifiable differential analysis of any said object detection collection against said baseline collection and also against object detection collections across time to derive the evidence of the indeterminate object existing inside the encompassing medium coming closer or moving further from any said nodes, and (ii) recording said object detections collections and the evidence to the non-transitory computer-readable medium or transmit said object detection collections and the evidence through the communication network;

wherein the apparatus is configured to derive the evidence of the indeterminate object in the specific area utilizing the additional circuit.

7. The apparatus of claim 2 further comprising:
   a) said apparatus enhanced to contain said nodes across various complimentary event types comprising at least one of: weight, atmospheric conditions, elevation, temperature, motion, vibration, sound, or attributes derived from images of the encompassing medium comprising at least one of color, texture, or color contrast, with said nodes further configured to convert said complimentary event types into discrete complimentary digital events and record said complimentary digital events through the communication network;
   b) said internode analytics circuit enhanced to be capable of (i) generating enhanced said aggregated baseline collections and enhanced said aggregated object detection collections aggregating said complimentary digital events with said baseline collection and said object detections collections, and (ii) recording said aggregated baseline collections and said aggregated object detection collections into the non-transitory computer-readable medium or transmit said aggregated baseline collections and said aggregated object detection collections through the communication network;
   c) said internode analytics circuit enhanced to be capable of (i) leveraging said aggregated baseline collections and said aggregated object detection collections for usage by the statistical or machine learning algorithms configured to utilize said aggregated baseline collections and said aggregated object detection collections to conduct the quantifiable differential analysis to derive the evidence of the indeterminate object within the specific area, and (ii) recording said aggregated baseline collections and said aggregated object detection collections and the evidence into the non-transitory computer-readable medium or transmit said aggregated baseline collections and said aggregated object detection collections and the evidence through the communication network;
wherein the apparatus is configured to derive the evidence of the indeterminate object in the specific area utilizing one or more of the additional circuits.

8. The apparatus of claim 2 further comprising:
   a) an external data communications circuit capable of (i) transmitting one of more of any said baseline collection, said aggregated baseline collections, said object detection collections, said aggregated object detection collections, said collection metadata, the quantifiable differential analysis, or the evidence to public or private compute cloud infrastructures, where said transmittal is conducted through the communication network;
   b) cloud based evidence detection circuitry running in hardware or software on said public or private cloud compute infrastructure capable of (i) conducting quantifiable differential analysis using the statistical or machine learning algorithms configured to utilize and said baseline collection, said aggregated baseline collections, said object detection collections, said aggregated object detection collections, said collection metadata, the quantifiable differential analysis, to increase the evidence of the indeterminate object or objects within the specific area, and (ii) record the evidence to said non-transitory computer-readable medium or transmit the evidence through said communication network;
   c) said external data circuit additionally capable of (i) receiving back to the apparatus the evidence derived by said cloud based evidence detection circuitry and (ii) transmitting the evidence through said communication network;
wherein the apparatus is configured to derive the evidence of the indeterminate object in the specific area utilizing one or more of the additional circuits.

9. A method for deriving evidence of an embedded indeterminate object emitting radiation in an encompassing medium, the method comprising:
   a) detecting potential evidence of the indeterminate object by at least one of a plurality of independent nodes, where each said node can (i) detection radiation energy from the indeterminate object, the radiation energy having an energy frequency or an energy frequency range and (ii) convert the radiation energy into discrete events;
   b) aggregating said events into samples using a time based unit of measurement, with a set number of said samples aggregated into (i) a baseline collection or (ii) object detection collections;
   c) providing a user steps for initiating one of (i) said baseline collection for a general area of the encompassing medium, or (ii) said object detection collections in a specific area of the encompassing medium;
   d) receiving within each said node, from an embodying apparatus, metadata comprising at least one of: time, date, global position latitude and longitude, or elevation to associate with the appropriate said baseline collection or said object detection collection;
   e) process and derive, using statistical or machine learning algorithms configured to utilize said baseline collection and said object detection collections, quantifiable differential analysis as the evidence of the indeterminate object within the specific area;
   f) retaining within said apparatus all said baseline collections, said object detection collections, and the metadata from all said nodes;
   g) providing the user of the apparatus, after the completion of processing said object detection collections, the evidence of the indeterminate object within the specific area;
wherein the user of the apparatus is provided the evidence of the indeterminate object within the specific area utilizing said baseline collection and said object detection collections.

10. The method of claim 9 further comprising at least one of:
   a) aggregating said baseline collection into aggregated baseline collections and said object detection collections into aggregated object detection collections from across said nodes;
   b) aggregating into said aggregated baseline collections and said aggregated object detection collections appropriate quantified said collection metadata;
   c) process and derive the evidence for the indeterminate object using said aggregate baseline collections and said aggregated object detection collections and using the statistical or machine learning algorithms configured to utilize said aggregate baseline collections and said aggregated object detection collections to conduct quantifiable differential analysis;
   d) performing quality metrics on said baseline collection and said object detection collections utilizing at least one of least one of Quantile-Quantile (QQ) analysis, outlier sample analysis, or other analysis capable of comparing collections of data;

e) deriving additional said evidence by weighting outlier samples from co-located said nodes differently than for remote said nodes for usage in grooming outlier data in said aggregated baseline collections and said aggregate object detection collections to emphasize the events that have a higher probability of having emanated from the indeterminate object as opposed to said events from environmental concerns;

wherein the user of the apparatus is provided with the evidence of the indeterminate object within the specific area utilizing said methods.

11. The method of claim 10 further comprising at least one of:
   a) detection of said samples within any said baseline collection or said object detection collection having an unacceptable level of outlier data using said quality metrics;
   b) communication from said node to said apparatus to trigger a retake at the specific location for said baseline collection or said object detection collection, or to communicate to said node that said baseline collection or said object detection collection not be used for the quantifiable differential analysis;
   c) providing the user options via an interface or external control device the ability to override the retake of said baseline collection or said object detection collections;
   d) communication between said nodes and the apparatus to negotiate a change in parameters comprised of at least one of: event samples taken per said baseline collection, event samples taken per said object detection collections, or the unit of time per sample, in order to improve the overall quality of the data being collected;

wherein the user of the apparatus is provided with the evidence of the indeterminate object within the specific area utilizing said methods.

12. The method of claim 10 further comprising at least one of:
   a) communication from the apparatus to said nodes comprising one of the instructions to retain specific exemplar said object detection collections collected during a specific timeframe, or providing exemplar said object detection collections to said node representing exemplar said object detection collections that aided in the discovery of the indeterminate object;
   b) deriving the evidence within each said node for the indeterminate object using the statistical or machine learning algorithms configured to utilize said exemplar baseline collection and said exemplar object detection collections to derive the evidence of the indeterminate object within the specific area and outputting quantifiable differential analysis as the evidence;

wherein the user of the apparatus is provided with the evidence of the indeterminate object within the specific area utilizing said methods.

13. The method of claim 10 further comprising at least one of:
   a) performing the quantifiable evidential analysis of the indeterminate object based upon said nodes having the capability to derive directionally unspecific evidence of an indeterminate object in the encompassing medium;
   b) performing additional aggregated node analysis at said apparatus level using said object detection collections gathered from directional nodes with event detecting sensors having stronger event sensing capabilities in a specific direction where the plurality of these said directional nodes have been placed on curved surfaces, either convex or concave, within the apparatus;
   c) analysis of the overall quantified evidential differential analysis from said directional nodes providing the evidence of the indeterminate object and the evidence regarding the location and depth for the indeterminate object in the encompassing medium using said aggregated object detection collections from directionally specific and directionally unspecific said nodes using
      (i) the statistical or the machine learning algorithms and
      (ii) geometric algorithms;

wherein the user of the apparatus is provided with the evidence of the indeterminate object within the specific area utilizing said methods.

14. The method of claim 10 further comprising:
   a) performing differential event analysis including said object detection collections or said aggregated object detection collections recently taken by other said nodes at adjoining specific locations in the apparatus, in order to derive evidence of the indeterminate object of interest coming closer or moving farther away from the apparatus;

wherein the user of the apparatus is provided with the evidence of the indeterminate object within the specific area utilizing said method.

15. The method of claim 10 further comprising at least one of:
   a) generating within the apparatus said aggregated baseline collections and said object detection collections including events from said nodes capable of detecting and deriving complimentary events comprising at least one of: weight variances, atmospheric conditions, or quantified ranges for elevation, temperature, motion, vibration, or attributes from images regarding the encompassing medium's color, texture, and color contrast;
   b) deriving the evidence for the indeterminate object using the statistical or machine learning algorithms configured to utilize said aggregated baseline collections and said aggregated object detection collections to derive the evidence of the indeterminate object within the specific area and outputting quantifiable differential analysis as the evidence;

wherein the user of the apparatus is provided with the evidence of the indeterminate object within the specific area utilizing said methods.

16. The method of claim 10 further comprising at least one of:
   a) communication to external processes outside the apparatus and transmittal of said node at least one of: baseline collection, said aggregated baseline collections, said node object detection collections, said aggregated object detection collections, the evidence currently derived;
   b) generation by said external said processes the quantifiable differential analysis;
   c) communication back to the apparatus the quantifiable differential analysis derived by the external systems and processes as the evidence of the indeterminate object at a specific location;
   d) alerting by the apparatus to the user the evidence of an indeterminate object in the encompassing medium;

wherein the user of the apparatus is provided with the evidence of the indeterminate object within the specific area utilizing said methods.

* * * * *

UNITED STATES PATENT AND TRADEMARK OFFICE
CERTIFICATE OF CORRECTION

| | | |
|---|---|---|
| PATENT NO. | : 11,740,382 B2 | Page 1 of 1 |
| APPLICATION NO. | : 17/248796 | |
| DATED | : August 29, 2023 | |
| INVENTOR(S) | : Mohler et al. | |

It is certified that error appears in the above-identified patent and that said Letters Patent is hereby corrected as shown below:

On the Title Page

Item (60) should read:
claims the benefit of provisional patent application 62/995,771, 02/13/2020

Signed and Sealed this
Twelfth Day of November, 2024

Katherine Kelly Vidal
*Director of the United States Patent and Trademark Office*